United States Patent [19]

Peles

[11] Patent Number: 5,167,201
[45] Date of Patent: Dec. 1, 1992

[54] SYSTEM FOR DISINFECTING MILKING APPARATUS

[75] Inventor: Eli Peles, Kibbutz Afikim, Israel

[73] Assignee: S.A.E. Afikim, Israel

[21] Appl. No.: 694,417

[22] Filed: May 1, 1991

[30] Foreign Application Priority Data

May 9, 1990 [IL] Israel ......................... 94341

[51] Int. Cl.$^5$ .............................................. A01J 7/00
[52] U.S. Cl. .................................................. 119/14.18
[58] Field of Search ............... 119/14.01, 14.02, 14.18, 119/14.08, 158; 604/251

[56] References Cited

U.S. PATENT DOCUMENTS

| | | | |
|---|---|---|---|
| 2,733,667 | 2/1956 | Hill | 103/236 |
| 2,999,499 | 9/1961 | Willet | 604/251 |
| 3,461,845 | 8/1969 | Peterson | 119/14.18 |
| 3,500,839 | 3/1970 | Bender | 134/57 |
| 3,958,584 | 5/1976 | Jones | 134/56 |
| 4,034,713 | 7/1977 | Umbaugh | 119/14.02 |
| 4,168,677 | 9/1979 | Brown | 119/14.18 |
| 4,175,514 | 11/1979 | Souza et al. | 119/14.18 |
| 4,222,346 | 9/1980 | Reisgies | 119/14.18 |
| 4,347,868 | 9/1982 | Scott | 119/14.08 |
| 4,462,425 | 7/1984 | Mehus | 119/14.18 |
| 4,572,105 | 2/1986 | Chowdhury et al. | 119/14.18 |

FOREIGN PATENT DOCUMENTS

| | | | |
|---|---|---|---|
| 1017567 | 1/1966 | United Kingdom | 119/14.18 |
| 2159685 | 12/1985 | United Kingdom | 119/14.08 |

Primary Examiner—John G. Weiss
Assistant Examiner—Todd E. Manahan
Attorney, Agent, or Firm—David L. Davis

[57] ABSTRACT

A milking system includes at least one milking cluster arranged for engagement with a cow's udder during milking, a milk collection conduit, and a backflush fluid conduit. There is provided a disinfecting arrangement including a milking valve assembly which is operative selectively to couple the milking cluster either to the milk collection conduit or to the backflush fluid conduit. The disinfecting arrangement also includes a connection pipe interconnecting the backflush fluid conduit and the milking valve assembly and apparatus for supplying a disinfectant to the backflush fluid at a location along the connection pipe adjacent each milking cluster.

13 Claims, 6 Drawing Sheets

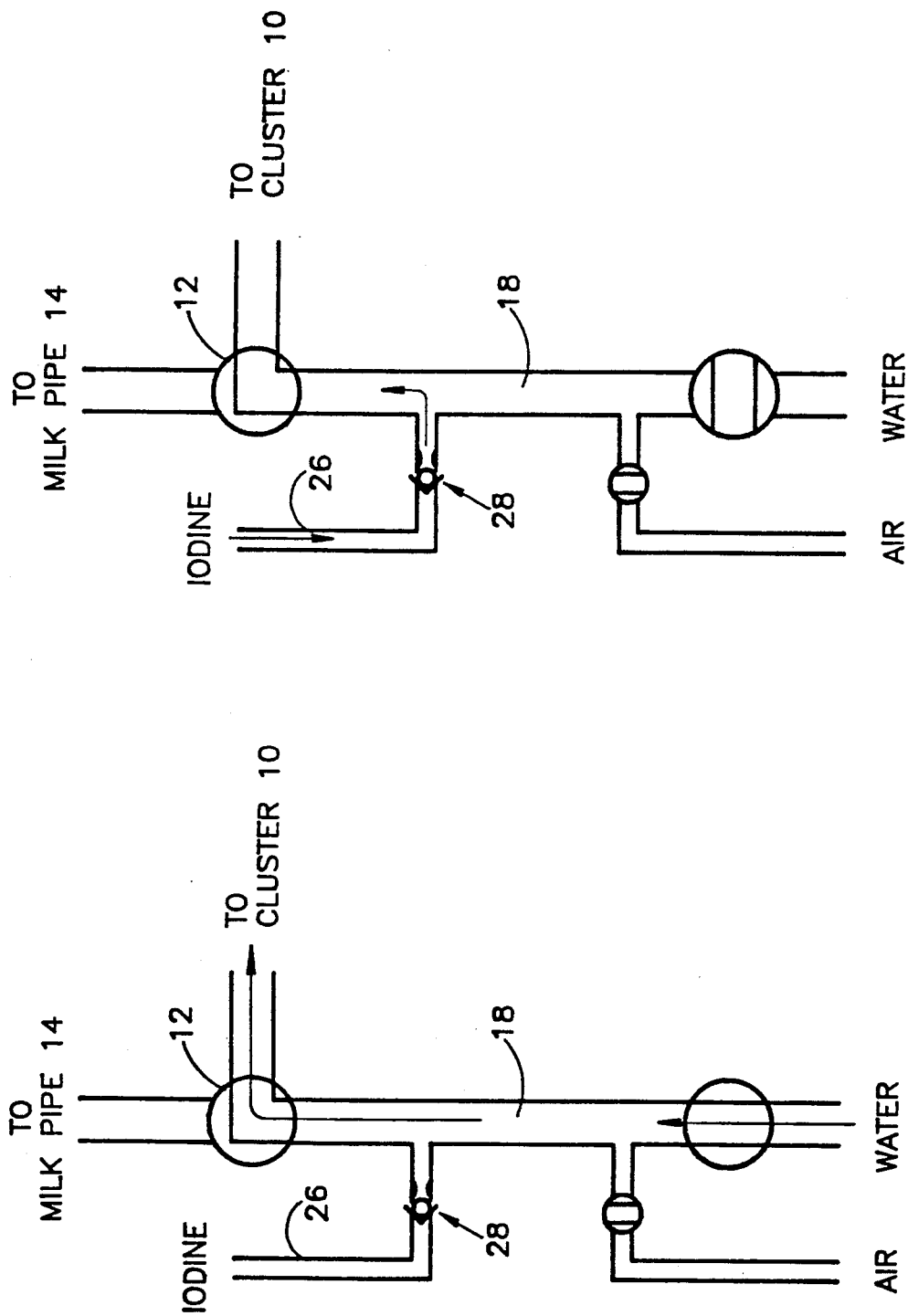

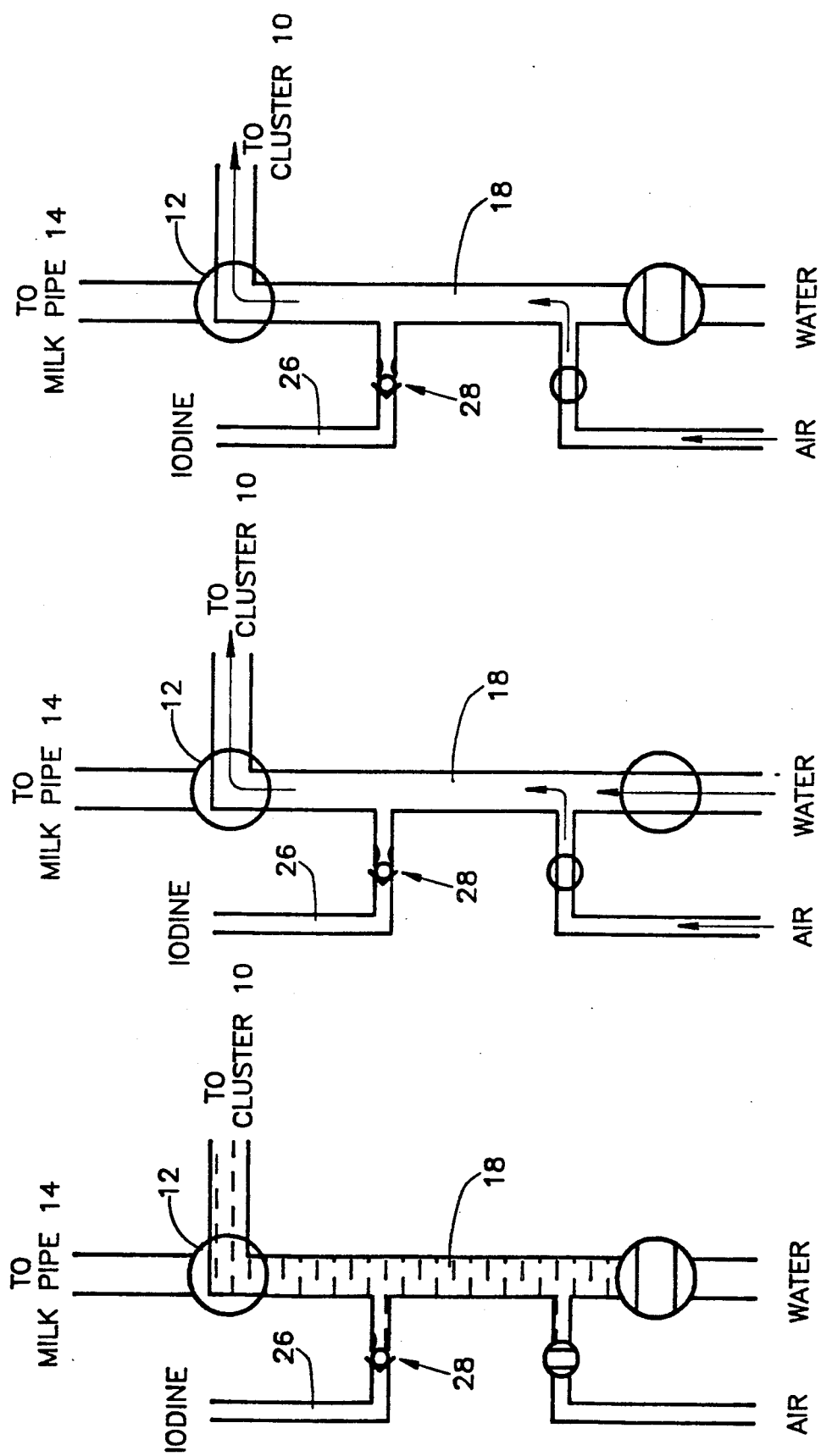

SYSTEM FOR DISINFECTING MILKING APPARATUS

FIELD OF THE INVENTION

The present invention relates to automated milking systems and more particularly to apparatus for disinfecting clusters.

BACKGROUND OF THE INVENTION

Various types of automatic milking systems are known and employ a plurality of milking clusters each of which physically engages the udder of each cow being milked. In order to prevent the spread of disease in a herd milked by an automatic milking system, it is necessary to disinfect the milking cluster between milkings of each different cow.

Conventionally the disinfection is provided by backflushing the milking cluster utilizing a rinse solution which contains a disinfectant. The rinse solution is passed through the piping of the system and thus a relatively large amount of disinfectant is required.

A state of the art automatic milking system is described in U.S. Pat. No. 4,168,677 to Brown.

SUMMARY OF THE INVENTION

The present invention seeks to provide an improved automatic milking system which requires much less disinfectant than was required according to the prior art.

There is thus provided in accordance with a preferred embodiment of the present invention a milking system including at least one milking cluster, a milk collection conduit, a backflush fluid conduit, a milking valve assembly operative to couple the milking cluster to the milk collection conduit or to the backflush fluid conduit and apparatus for supplying a disinfectant to backflush fluid at a location adjacent each milking cluster.

In accordance with a preferred embodiment of the invention, the apparatus for supplying a disinfectant includes a one-way valve and a flow restrictor. In one preferred embodiment of the invention, the flow restrictor comprises a commercially available drip irrigation unit.

In accordance with a preferred embodiment of the invention, the milking system comprises a plurality of milking clusters and a milk collection conduit and a backflush fluid conduit which are common to the plurality of clusters and are coupled to each cluster by a milking valve assembly. In this embodiment, the disinfectant is supplied to a pipe which joins the backflush fluid conduit to the milking valve assembly.

Additionally in accordance with a preferred embodiment of the present invention, there is provided for use in a milking system including at least one milking cluster, a milk collection conduit, a backflush fluid conduit, and a milking valve assembly operative to couple the milking cluster to the milk collection conduit or to the backflush fluid conduit, apparatus for supplying a disinfectant to backflush fluid at a location adjacent each milking cluster.

Additionally in accordance with a preferred embodiment of the present invention there is provided a technique for backflusing milking clusters in a milking system including at least one milking cluster, a milk collection conduit, a backflush fluid conduit, a milking valve assembly operative to couple the milking cluster to the milk collection conduit or to the backflush fluid conduit, including the step of supplying a disinfectant to backflush fluid at a location adjacent each milking cluster.

Additionally in accordance with a preferred embodiment of the invention, the technique includes the steps of:

rinsing the cluster with water;
supplying a disinfectant to water in the cluster and allowing it to reside for a given time; and
rising the cluster with air and water in a turbulent flow to flush the disinfectant solution from the cluster.

Further in accordance with an embodiment of the invention, the cluster may be subsequently dried using air.

There is also provided in accordance with a further preferred embodiment of the present invention a milking system including at least one milking cluster, a milk collection conduit, a backflush fluid conduit, a milking valve assembly operative to couple at least one milking cluster to the milk collection conduit or to the backflush fluid conduit, the milking valve assembly including at least one sealing member for preventing fluid communication between the at least one milking cluster and an individual one of the milk collection conduit and the backflush fluid conduit when in a sealing orientation and for allowing fluid communication between the at least one milking cluster and the individual one of the milk collection conduit and the backflush fluid conduit when in a non-sealing orientation, and at least one orientation altering member for changing the orientation of the at least one sealing member, the at least one orientation altering member being normally sealed off from the fluid flowing between the at leat one milking cluster and the individual one of the milk collection conduit and the backflush fluid conduit.

Further in accordance with a preferred embodiment of the present invention, each orientation altering member includes a spring.

Still further in accordance with a preferred embodiment of the present invention, each orientation altering member includes a disc-like support member against which the spring is seated.

Additionally in accordance with a preferred embodiment of the present invention, the at least one sealing member includes a first sealing member for preventing and allowing fluid communication between the at least one milking cluster and the milk collection conduit and a second sealing member for preventing and allowing fluid communication between the at least one milking cluster and the backflush fluid conduit.

BRIEF DESCRIPTION OF THE DRAWINGS

The present invention will be understood and appreciated more fully from the following detailed description. taken in conjunction with the drawings in which:

FIGS. 3A, 3B, 3C, 3D and 3E are illustrations of five stages in backflushing in accordance with the present invention;

DETAILED DESCRIPTION OF A PREFERRED EMBODIMENT

Figure 1:
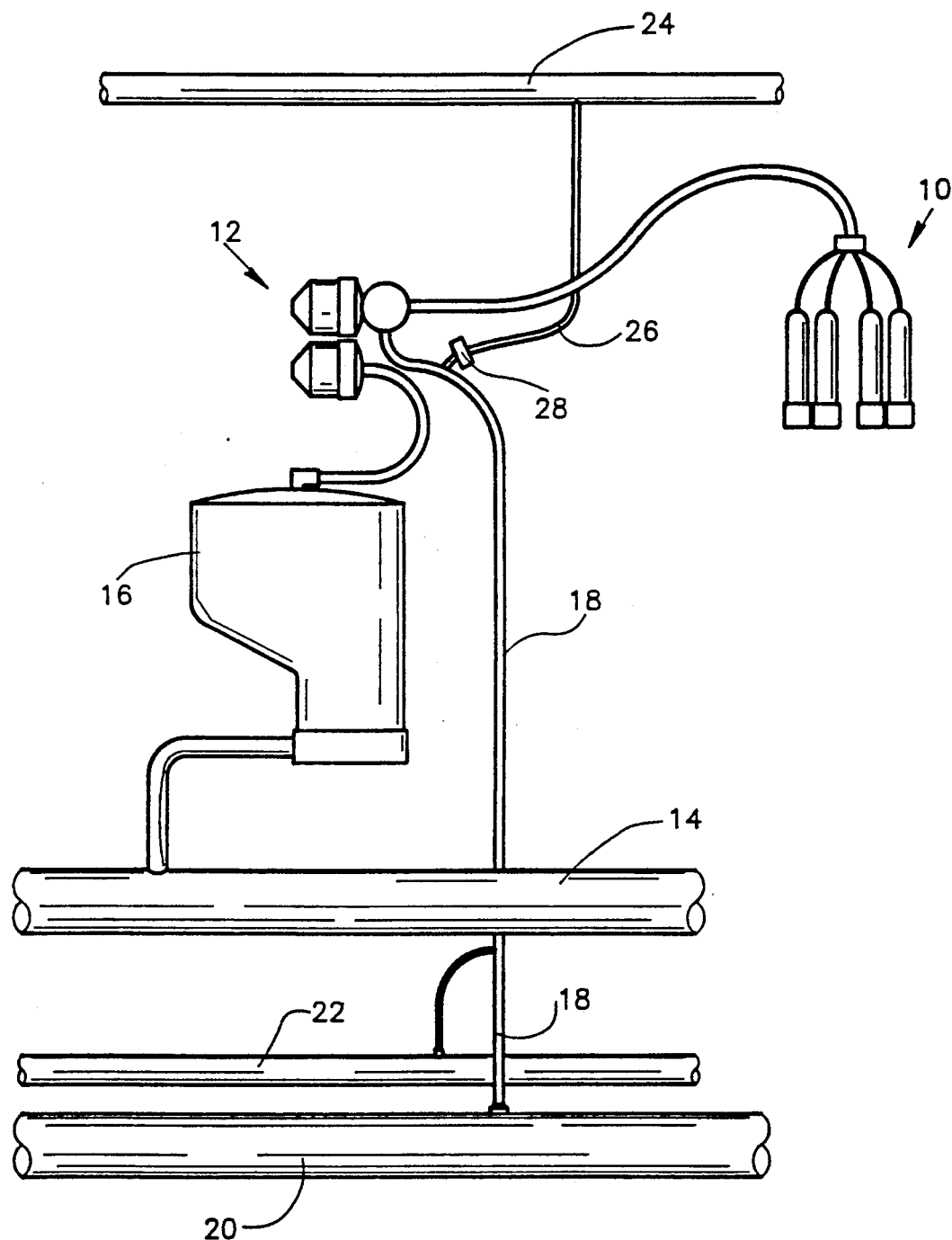
FIG. 1 is a pictorial illustration of part of a milking system constructed and operative in accordance with a preferred embodiment of the present invention.

Reference is now made to FIG. 1, which illustrates part of a milking system constructed and operative in accordance with a preferred embodiment of the present ivention. Automatic milking systems of this general type are in common use and are manufactured, inter alia, by Alfa Laval of Sweden. The system comprises, inter alia, a plurality of clusters 10, which are arranged to apply vacuum to and thereby extract milk from the udders of a cow.

Each cluster 10 is selectably coupled via a milking valve assembly 12, such as is manufactured by DEC, United States. to a source of vaccum (not shown) and to a common milk receiving pipe 14 via an optional milk meter 16, such as is manufactured by Delaval, Sweden Serge. Milking valve assembly 12 also selectably couples each cluster 10 via a backflush pipe 18 to a backflush water conduit 20 and a pressurized air conduit 22. Typically, the water and air conduits each have a central valve (not shown) thus enabling a plurality of clusters to be backflushed simultaneously.

In accordance with a preferred embodiment of the present invention, a disinfectant, such as a highly concentrated iodine solution for example 1%, is supplied via a supply pipe 26 to backflush pipe 18 at a location intermediate the connections to conduits 20 and 22 and the milking valve assembly 12, and thus closely adjacent to cluster 10. Accordingly, for a required concentration of disinfectant at cluster 10, a much lower quantity of disinfectant is required than would be the case, were the disinfectant added to the backflush water flowing in conduit 20. This is particularly the case because the volume of water in cluster 10 is much smaller than the volume of water in conduit 20.

In accordance with the present invention, the disinfectant is added only to the liquid, such as water, which actually flushes the cluster 10 and not to the liquid which fills conduit 20.

In accordance with a preferred embodiment of the invention, the disinfectant is supplied from a disinfectant supply conduit 24, which may be common to plural milking stations, via a supply pipe 26 at each milking station and via a disinfectant supply valve and restrictor assembly 28, which preferably comprises a one-way valve, preventing flow from pipe 18 into pipe 26, and a flow restrictor, such as that found in a conventional pressure controlled drip irrigator, such as those commercially available from Netafim, Israel, under model number 4L/H.

Figure 2:
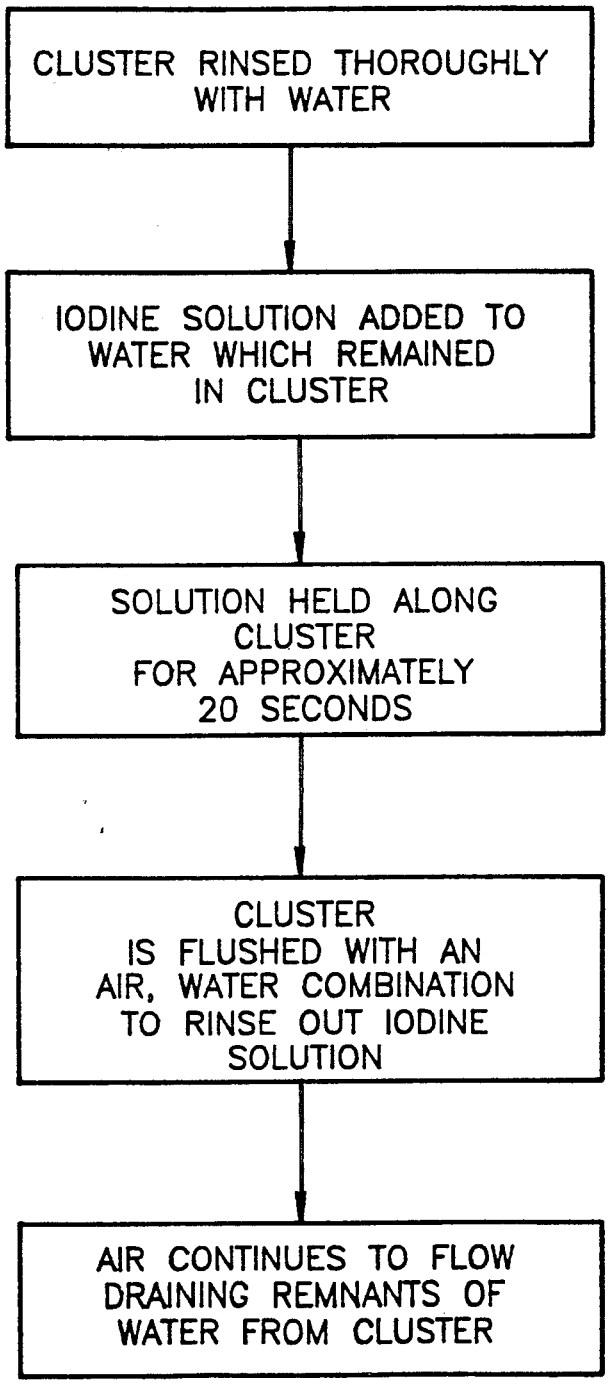
FIG. 2 is a flow chart illustrating operation of the present invention.

The operation of the present invention during backflushing operation will now be described with reference to the flow chart of FIG. 2 and the operational diagrams of FIGS. 3A-3E.

Initially, as illustrated in FIG. 3A, water is supplied from conduit 20 (FIG. 1) through cluster 10 for thorough rinsing thereof.

In a subsequent stage of operation, illustrated in FIG. 3B, the water flow through the pipe 18 is terminated and with the aid of a pump or a flow of air pressure, the disinfectant passes through pipe 24 to pipe 26 and from pipe 26 through valve and restrictor assembly 28 into pipe 18, and from pipe 18 to the cluster 10. The backflush liquid containing the disinfectant remains in the cluster typically at a concentration of 25 or 50 ppm for a given time, typically 20 seconds, as illustrated in FIG. 3C.

Subsequently, both air and water are caused to flow through pipe 18 and cluster 10, in a turbulent flow, as illustrated in FIG. 3D, thus rinsing out the disinfectant solution from pipe 18 and cluster 10.

Finally, the water flow is terminated and the air flow continued to dry out the interiors of the pipe 18 and cluster 10.

Figure 4A:
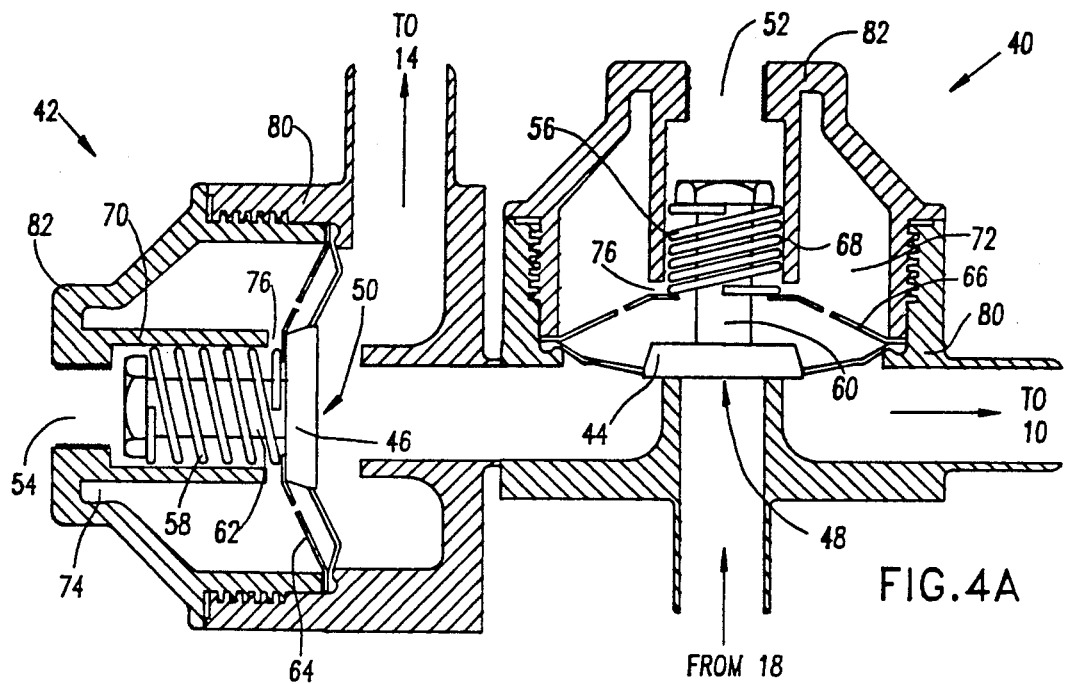
FIGS. 4A and 4B are cross sectional illustrations of a preferred embodiment of a valve forming part of the milking system of FIG. 1 in respective first and second operative orientations.
Figure 4B:
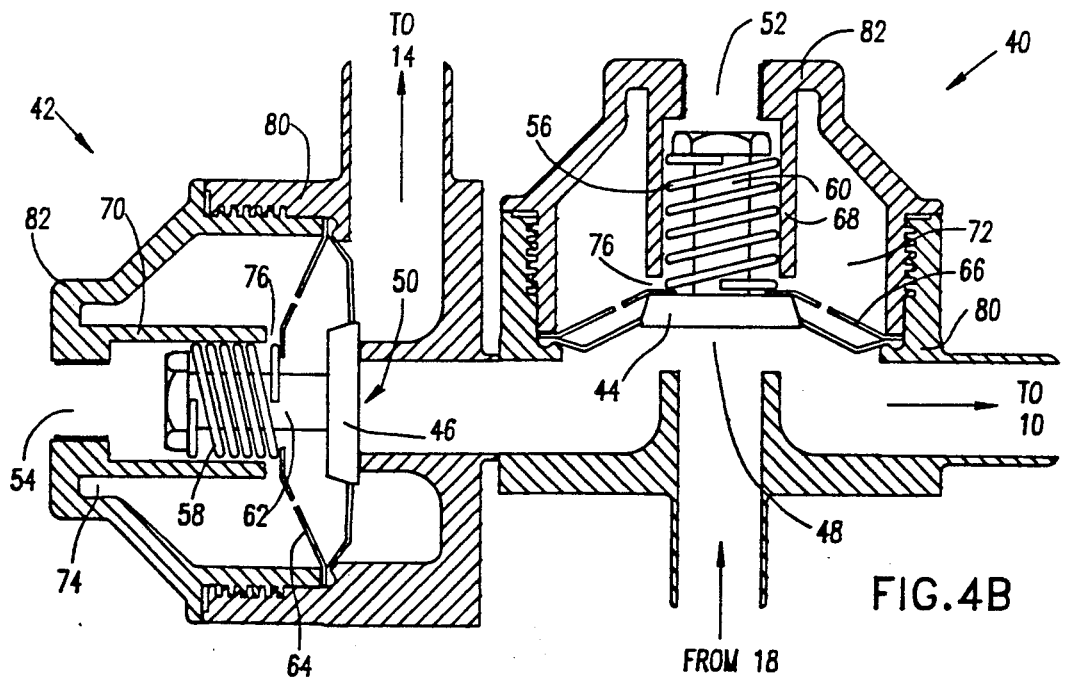

Reference is now made to FIGS. 4A and 4B which are cross sectional illustrations of a preferred embodiment of valve assembly 12 in respective first and second operative orientations. It is appreciated, however, that the valve assembly of FIGS. 4A and 4B may be useful in a variety of devices other than in the automatic milking system shown and described herein.

The valve assembly of FIGS. 4A and 4B couples a milking cluster 10 to milk pipe 14 (FIG. 4A) or to backflush pipe 18 (FIG. 4B). The valve assembly comprises two substantially identical subunits 40 and 42, controlling fluid communication between cluster 10 and between backflush pipe 18 and milk pipe 14 respectively. Each subunit 40 and 42 comprises a diaphragm, referenced 44 and 46 respectively, operatively associated with an opening, referenced 48 and 50 respectively, to pipes 18 and 14, respectively. Each diaphragm is also operatively associated with a pressurized air supply conduit, referenced 52 and 54 respectively, which communicates with a source of pressurized fluid such as air or water (not shown).

In a first operative orientation of the valve assembly, illustrated in FIG. 4A, pressurized air is supplied via pressurized air supply conduit 52 and causes diaphragm 44 to engage the lips of aperture 48, thereby to prevent fluid communication between backflush pipe 18 and cluster 10 while allowing fluid communication between cluster 10 and milk pipe 14. In a second operative orientation of the valve assembly, illustrated in FIG. 4B, pressurized air is supplied via pressurized air supply conduit 54 and diaphragm 46 engages the lips of aperture 50, thereby to allow fluid communication between backflush pipe 18 and cluster 10 while preventing fluid communication between cluster 10 and milk pipe 14.

Preferably, each subunit 40 and 42 also comprises a spring, referenced 56 and 58 respectively, operatively associated with diaphragms 44 and 46 respectively. The springs 56 and 58 are preferably mounted on elongate stopping members 60 and 62 respectively which are fixedly associated with diaphragms 44 and 46 respectively. Each spring is preferably compressed as the corresponding diaphragm assumes its aperture sealing position. Conversely, each spring extends, thereby to retract the corresponding diaphragm, when pressurized air is no longer supplied.

Each spring 56 or 58 is preferably seated on a disk-like support member 64 or 66 respectively, which is preferably suitably apertured in order to facilitate pressurized air communication between the pressurized air volumes on either side of each disk-like support member.

According to one preferred embodiment of the present invention, each spring 56 or 58 and associated stopping member 60 or 62 are preferably seated within a generally cylindrical hollow member 68 or 70 which are preferably disposed generally coaxially with and radially inward of a pressurized air compartment 72 or 74 respectively. Pressurized air communication between cylinders 68 and 70 and respective pressurized air compartments 72 and 74 is provided via a suitable aperture or apertures 76 in the walls of cylinders 68 and 70.

The disk-like support members 64 and 66 may be formed of any suitable material, such as stainless steel, and are respectively supported by the bases of pressurized air compartments 74 or 72, respectively as shown. Preferably, the housing defining each pressurized air compartment comprises a bottom portion 80 which threadably engages a top portion 82. Screwing top portion 82 onto bottom portion 80 has the effect of fixedly associating the disk-like support members 66 and 64 as well as the diaphragms 44 and 46 with the bases of pressurized air compartments 72 and 74 respectively, as shown.

A particular feature of the apparatus of FIGS. 4A and 4B is that the springs 56 and 58, as well as the stopping members 60 and 62, are normally sealed off from the milk flowing from the milking cluster 10 to the milk collection unit 14, and also preferably from the backflush fluid flowing from the milking cluster 10 to the backflush fluid conduit 18.

Figure 5:
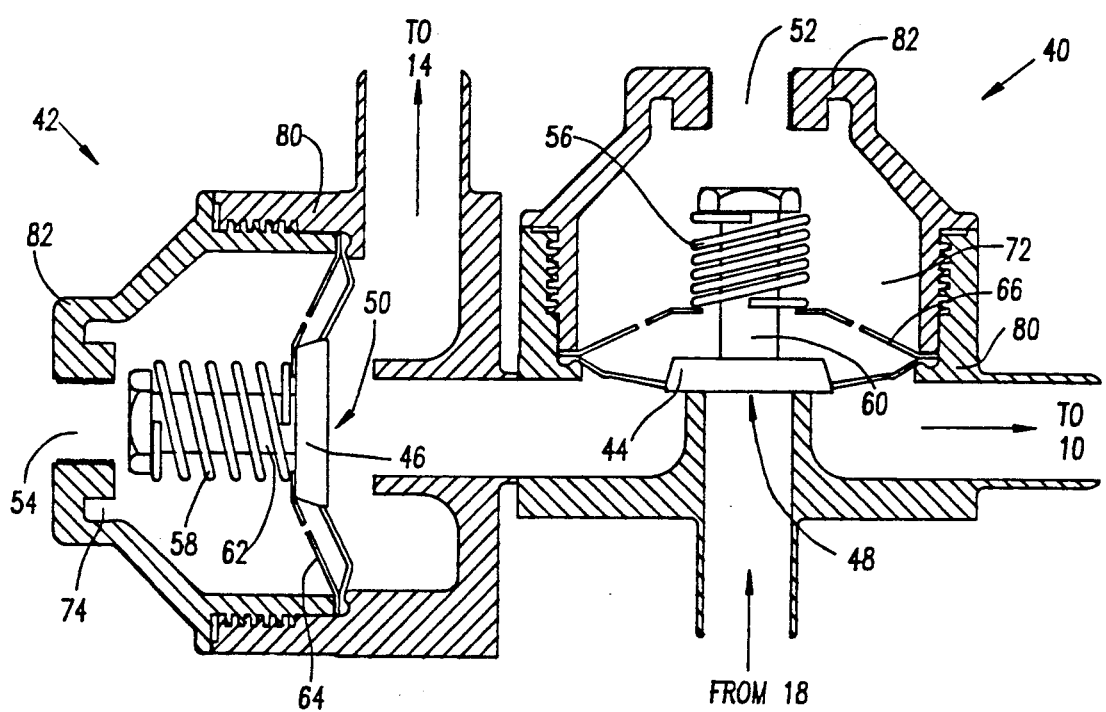
FIG. 5 is a cross sectional illustration of a second preferred embodiment of the valve forming part of the milking system of FIG. 1 in a first operative orientation.

As shown in FIG. 5, cylindrical hollow member 68 may be omitted.

It will be appreciated by persons skilled in the art that the present invention is not limited to what has been particularly shown and described hereinabove. Rather the scope of the present invention is defined by the claims which follow:

I claim:
1. A milking system comprising:
   at least one milking cluster;
   a milk collection conduit;
   a backflush fluid conduit;
   a connection pipe coupled to said backflush fluid conduit;
   a milking valve assembly operative to couple the at least one milking cluster to the milk collection conduit or, via said connection pipe, to the backflush fluid conduit; and
   means for supplying a disinfectant to backflush fluid at a location along said connection pipe adjacent each milking cluster.

2. Apparatus according to claim 1 and wherein said means for supplying a disinfectant comprises a one-way valve and a flow restrictor.

3. Apparatus according to claim 1 and wherein:
   said at least one cluster comprises a plurality of milking clusters and said milking valve assembly comprises a corresponding plurality of milking valves;
   said milk collection conduit and said backflush fluid conduit are common to the plurality of clusters and are coupled to each cluster by a corresponding one of said plurality of valves; and
   said means for supplying comprises means for supplying the disinfectant in which the disinfectant is supplied to a pipe which joins the backflush fluid conduit to the milking valve assembly.

4. Apparatus according to claim 1 and also comprising a pressurized air conduit and means for supplying pressurized air from said pressurized air conduit together with backflush fluid for providing turbulent flushing of said at least one cluster.

5. Apparatus according to claim 1 wherein said at least one milking cluster comprises a plurality of milking clusters.

6. A milking system according to claim 1 and wherein said milking valve assembly comprises:
   at least one sealing member for preventing fluid communication between said at least one milking cluster and an individual one of said milk collection conduit and said backflush fluid conduit when in a sealing orientation and for allowing fluid communication between said at least one milking cluster and the individual one of said milk collection conduit and said backflush fluid conduit when in a non-sealing orientation; and
   at least one orientation altering member for changing the orientation of said at least one sealing member, said at least one orientation altering member being normally sealed off from the fluid flowing between said at least one milking cluster and the individual one of said milk collection conduit and said backflush fluid conduit.

7. A milking system according to claim 6 wherein each orientation altering member comprises a spring.

8. A milking system according to claim 7 wherein each orientation altering member comprises a disc-like support member against which the spring is seated.

9. A milking system according to claim 6 wherein said at least one sealing member comprises:
   a first sealing member for preventing and allowing fluid communication between said at least one milking cluster and said milk collection conduit; and
   a second sealing member for preventing and allowing fluid communication between said at least one milking cluster and said backflush fluid conduit.

10. A milking system comprising:
    at least one milking cluster;
    a milk collection conduit;
    a backflush fluid conduit;
    a milking valve assembly operative to couple the at least one milking cluster to the milk collection conduit or to the backflush fluid conduit; and
    means for supplying a disinfectant to backflush fluid at a location adjacent each milking cluster, said means for supplying a disinfectant comprising a one-way valve and a flow restrictor including a drip irrigation unit.

11. A milking system comprising:
    at least one milking cluster;
    a milk collection conduit;
    a backflush fluid conduit;
    a connection pipe coupled to said backflush fluid conduit;
    a milking valve assembly operative to couple the at least one milking cluster to the milk collection concuit or, via said connection pipe, to the backflush fluid conduit; and
    a pressurized air conduit and means for supplying pressurized air from said pressurized air conduit together with backflush fluid at a location along said connection pipe adjacent each milking cluster for providing turbulent flushing of said at least one cluster.

12. Apparatus according to claim 11 wherein said at least one milking cluster comprises a plurality of milking clusters.

13. Apparatus according to claim 11 wherein said milking valve assembly comprises a plurality of milking valves each operative to couple a milking cluster to the milk collection conduit or to the backflush fluid conduit.

* * * * *